（12）United States Patent
Ollivier

(10) Patent No.: US 10,245,452 B2
(45) Date of Patent: Apr. 2, 2019

(54) APPARATUS FOR SUSPENDING A LOAD ON A ROPE

(71) Applicant: TAZ, Saint Vincent de Mercuze (FR)

(72) Inventor: Pascal Ollivier, Saint-Nazaire-les-Eymes (FR)

(73) Assignee: TAZ, Saint Vincent de Mercuze (FR)

( * ) Notice: Subject to any disclaimer, the term of this patent is extended or adjusted under 35 U.S.C. 154(b) by 0 days.

(21) Appl. No.: 15/317,795

(22) PCT Filed: Jun. 2, 2015

(86) PCT No.: PCT/EP2015/062207
§ 371 (c)(1),
(2) Date: Dec. 9, 2016

(87) PCT Pub. No.: WO2015/189066
PCT Pub. Date: Dec. 17, 2015

(65) Prior Publication Data
US 2017/0106216 A1 Apr. 20, 2017

(30) Foreign Application Priority Data
Jun. 11, 2014 (FR) ..................................... 14 55283

(51) Int. Cl.
A62B 1/14 (2006.01)
F16D 63/00 (2006.01)

(52) U.S. Cl.
CPC .............. A62B 1/14 (2013.01); F16D 63/008 (2013.01)

(58) Field of Classification Search
CPC ................................ A62B 1/14; F16D 63/008
(Continued)

(56) References Cited

U.S. PATENT DOCUMENTS

2006/0207829 A1* 9/2006 Mauthner ................ A62B 1/14
182/5
2011/0048852 A1* 3/2011 Wolf ........................ A62B 1/14
182/5

(Continued)

FOREIGN PATENT DOCUMENTS

EP 0 398 819 A1 11/1990
EP 1 834 672 A1 9/2007

(Continued)

OTHER PUBLICATIONS

International Search Report dated Aug. 11, 2015, issued in corresponding International Application No. PCT/EP2015/062207, filed Jun. 2, 2015, 2 pages.

Primary Examiner — Robert A. Siconolfi
Assistant Examiner — San M Aung
(74) Attorney, Agent, or Firm — Christensen O'Connor Johnson Kindness PLLC

(57) ABSTRACT

The invention relates to an apparatus for suspending a load on a suspension rope, including a body (3) provided with a means (19, 20) for hanging the load, with a stationary member (6) and with a pivotable rocker arm member (7), between which the rope (2) passes, which are capable of immobilizing the body along the rope (2) when said body tilts in a direction determined by the load. Said body is also provided with a stationary abutment (22) and with a pivotal unlocking lever (14) capable of controlling the pivotal rocker arm member (7) such as to make the latter pivot until said abutment (22) and to cause said body (3) to tilt in the opposite direction when the rocker arm member (7) is bearing against said abutment (22).

4 Claims, 6 Drawing Sheets

(58) Field of Classification Search
USPC .......................................................... 188/65.2
See application file for complete search history.

(56) References Cited

U.S. PATENT DOCUMENTS

| | | | | |
|---|---|---|---|---|
| 2011/0073417 A1* | 3/2011 | Chaumontet | ............ | A62B 1/14 188/65.5 |
| 2013/0032433 A1* | 2/2013 | Codega | .................... | A62B 1/14 182/5 |
| 2014/0196984 A1* | 7/2014 | Chabod | .................... | A62B 1/14 182/18 |

FOREIGN PATENT DOCUMENTS

| | | |
|---|---|---|
| EP | 2 301 631 A1 | 3/2011 |
| FR | 2 626 184 A1 | 7/1989 |

\* cited by examiner

APPARATUS FOR SUSPENDING A LOAD ON A ROPE

The present invention relates to the field of apparatus for suspending a load on a rope, which is capable of constituting a self-locking descender.

In the current state of the art, there are two types of self-locking descender: those that are suitable for installation on taut ropes, i.e. on ropes that are stretched between an upper anchoring point and a lower anchoring point; and those that are suitable for installation on "loose" ropes, i.e. on ropes that are attached only to an upper anchoring point.

Patent EP 2 301 631 describes a suspension apparatus in which a rope may be held between a stationary member and a rocker arm member. When the rocker arm member is remote from the stationary member, through the effect of an unlocking lever, the rope may be released. The unlocking lever is specifically mounted on the body of the apparatus in order successively to give rise, during the travel thereof, for two forces of different values on the rocker arm member in order to produce a geared-down effect in an initial part of the travel thereof.

The object of the present invention is to propose an apparatus for suspending a load that can constitute a self-locking descender capable of installation either on a taut rope or on a loose rope.

According to one embodiment, an apparatus is proposed for suspending a load on a suspension rope, which comprises a body provided with a means for attaching the load and provided with a stationary member and with a pivotal rocker arm member between which the rope passes and which are capable of immobilizing the body along the rope when said body tilts in a direction determined by the load.

Said body also is provided with a stationary abutment and with an unlocking lever mounted pivotably on this body, said unlocking lever being capable of acting on the pivotal rocker arm member in order to cause the latter to pivot as far as said abutment and in order to cause said body to tilt in the opposite direction when the rocker arm member bears against said abutment.

By virtue of the existence of said stationary abutment, the pivoting of the rocker arm member is limited in the unlocking direction such that the unlocking lever is able, in a first step, to give rise to the tilting of the rocker arm member toward said stationary abutment and then, in a second step, to give rise to a tilting of the body in the opposite direction when the rocker arm member bears on said abutment and is no longer able to pivot relative to the body, such that, at the time of this second step, the body, the rocker arm member and the unlocking lever are interconnected and immobilized relative to one another.

The rocker arm member may have a pinching part located facing a pinching part of the stationary member and a bearing part remote from its pinching part in such a manner that an intermediate portion of the rope extends through a gap separating said pinching parts and in front of said bearing part.

Said means for attaching the load may be located on the side of the stationary member relative to the rope and on the side of the bearing part of the rocker arm member relative to the said gap.

Thus, through the effect of the suspended load, said intermediate portion of the rope may be deflected relative to a taut strand of the rope and may act on said bearing part of the rocker arm member in the direction that tends to bring the pinching parts closer together, in such a manner as to produce a local pinching effect on the suspension rope between these pinching parts.

Said abutment for the rocker arm member may limit the gap between said pinching parts to a maximum separation.

Said unlocking lever may be capable of acting on the rocker arm member in the direction of distancing of said pinching parts when said unlocking lever is pivoted relative to the body in the opposite direction from the pivoting direction of the rocker arm member.

Said unlocking lever may be capable of causing the body to tilt in the direction of the reduction of the deviation of the intermediate portion of the suspension rope relative to said taut strand when the rocker arm member bears against said abutment through the effect of said unlocking lever.

Said rocker arm member may comprise opposite arms having said pinching part and said bearing part. Said unlocking lever may have an end engaged in a recess of the end of the arm of the rocker arm member having said pinching part.

Said body may comprise plates having corresponding passages for attaching the load.

An apparatus for suspending a load on a suspension rope will now be described by way of non-limiting example, illustrated by the appended drawing, in which.

Figure 1:
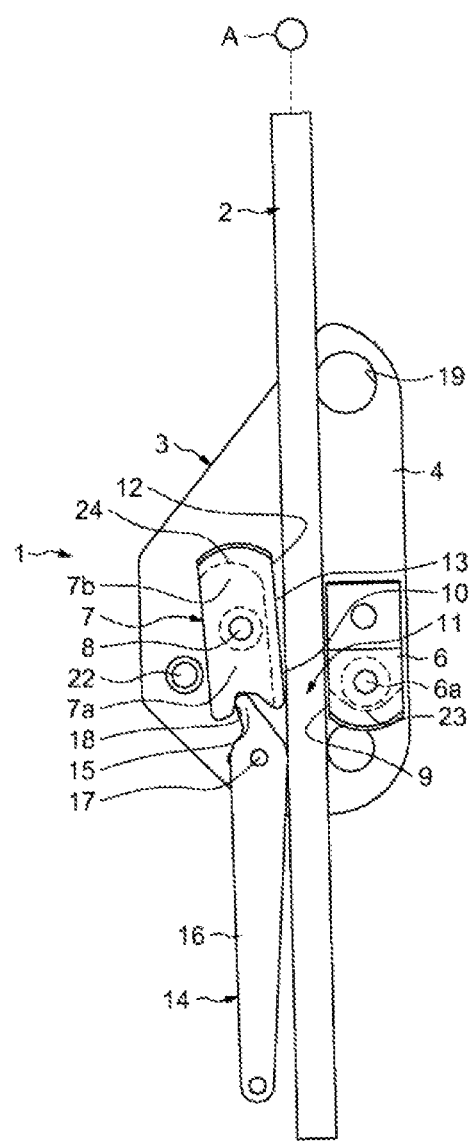
FIG. 1 shows a partial side view of the suspension apparatus in the installation position, one pivoting plate being removed.
Figure 2:
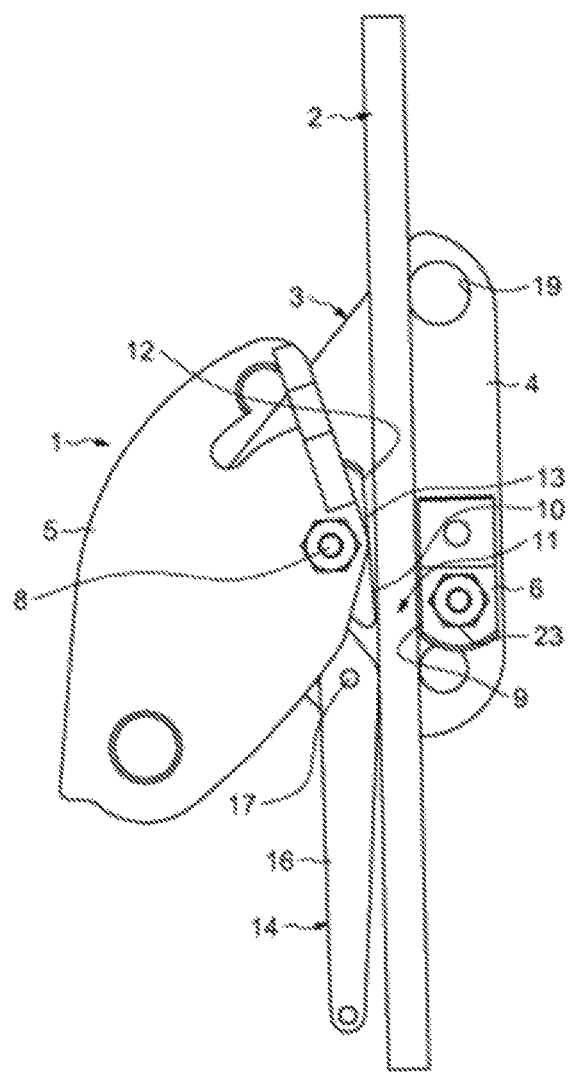
FIG. 2 shows a partial side view of the suspension apparatus in the installation position, the pivoting plate being in the open position.
Figure 3:
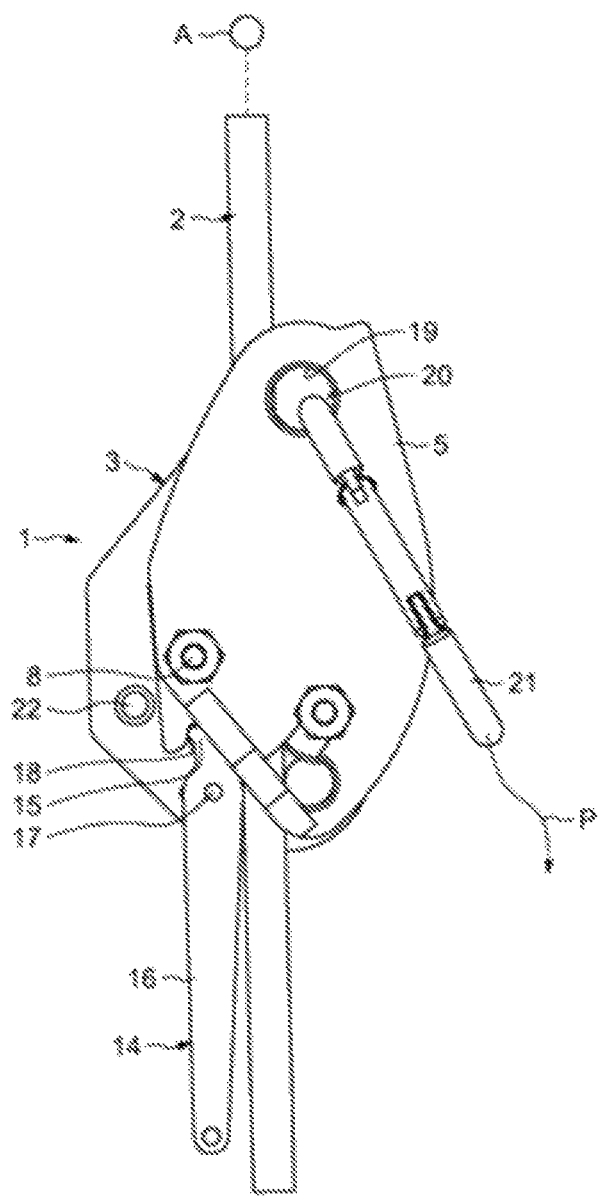
FIG. 3 shows a side view of the suspension apparatus in the installation position, the pivoting plate being in the closed position.

As illustrated in FIGS. 1 to 3, an apparatus 1 for suspending a load on a rope 2, for example a cord, comprises a body 3 that comprises a bearing plate 4 and a pivotal plate 5 extending parallel to one another.

Of these plates, the plate 4 is provided with a stationary member 6 and with a rocker arm member 7 mounted pivotably about a pin 8 perpendicular to the plate 4 so that the rocker arm member 7 is able to pivot parallel to the plates 4 and 5 and has, on either side of this pin 8, opposite arms 7a and 7b.

The stationary member 6 and the arm 7a of the rocker arm member 7 have, on the side of their ends, pinching parts 9 and 10 located facing one another so as to define a gap 11 between them.

The arm 7b of the rocker arm member 7 has, on the side of its end, a bearing part 12 remote from its pinching part 10 and located at a distance from the gap 11.

The plate 5 is mounted pivotably relative to the plate 4 on the pin 8 between an open position (FIG. 2) in which a portion of the rope 2 can be positioned laterally and extend parallel to the plates 4 and 5, between the stationary member 6 and the rocker arm member 7, and a closed position, or operating position, (FIG. 3) in which it covers the rope 2. In this closed, or operating, position, the plate 5 abuts against a fastening element 6a of the stationary member 6 on the plate 4.

The plates 4 and 5 have corresponding contours such that, in said closed, or operating, position, they are superposed.

When the rope 2, arranged rectilinearly, is positioned, it passes through the gap 11, between the pinching parts of 10 and in front of the bearing part 12. A zone 13 of the rocker arm member 7 joining the pinching part 10 and the bearing part 12 lies along the rope 2. In this positioning position, the suspension apparatus 1 may be moved freely along the rope 2.

The body 3 is provided with an unlocking lever 14 that comprises a part 15 engaged between the plates 4 and 5 and a part 16 that extends largely outside the space separating the plates 4 and 5 in such a manner as to form a maneuvering arm.

The part 15 of the unlocking lever 14 is mounted on the plate 4 by means of a pin 17 perpendicular to the latter such that the unlocking lever 14 is able to pivot parallel to the plates 4 and 5.

The pin 17 is arranged such that the part 15 of the unlocking lever 14 extends toward the end of the arm 7a of the rocker arm member 7 and such that the end of this part 15 is engaged in a recess 18 made in the end of the arm 7a, close to the pinching part 10, so as to interact in order that the tilt member 7 and the unlocking lever 14 pivot in opposite directions.

In said positioning position, the unlocking lever 14 extends approximately parallel to the rope 2.

The body 3 also has means for attaching a load that comprise attaching passages 19 and 20 made in the plates 4 and 5 and facing one another when the plates 4 and 5 are in said closed, or operating, position.

In said positioning and closed positions (FIGS. 1 and 3), the passages 19 and 20 are arranged on the same side as the stationary member 6 relative to the rope 2 and are located on the side of the bearing part 12 relative to the gap 11, being further remote from this gap 11 than is the bearing part 12, for example twice as far away.

The aforesaid attaching means also comprise a clasp 21 passing through the attachment passages 19 and 20, on which the load may be attached, for example using an intermediate cord.

The body 3 is also provided with a stationary abutment 22 fixed on the plate 4 and against which the arm 7a of the rocker arm member 7 is able to bear so as to limit the gap 11 between the pinching parts 9 and 10 to a maximum separation.

Furthermore, the stationary member 6 has a bearing groove 23 made in the zone of its pinching part 9 and the rocker arm member 7 has a bearing groove 24 made in the zone of its pinching part 10, of its median zone 13 and of its bearing part 12. These grooves 23 and 24 are capable of receiving the rope 2 laterally, over a small thickness.

A description will now be given of how the suspension apparatus 1 operates.

In a start position illustrated in FIGS. 1 and 3, the suspension apparatus 1 is positioned on a rope 2 of which an upper end is attached to an anchoring point A and a load P, for example a user, is attached to the snap hook 21 without stressing the suspension apparatus.

Assuming the rope 2 extends vertically, while the pinching parts 9 and 10 are offset horizontally, arms 7a and 7b of the rocker arm lever 7 extend, respectively, downward and upward relative to the pin 8, the passages 19 and 20 are above and at a distance from the stationary member 6 and are higher than the bearing part 12 of the rocker arm lever 7 and the maneuvering arm 16 of the unlocking lever 14 extends downward.

Figure 4:
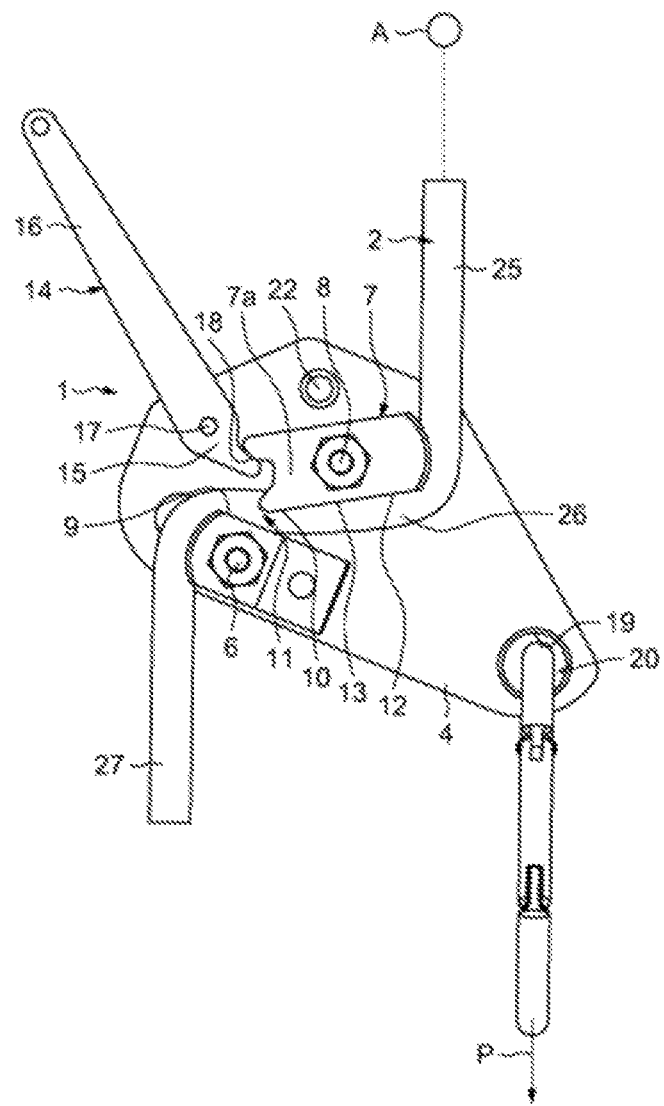
FIG. 4 shows a partial side view of the suspension apparatus in the locking and immobilizing position.

The load P becoming suspended from the suspension apparatus 1, the suspension apparatus 1 reaches a locked position at a location along the rope 2, illustrated in FIG. 4.

This locked position is reached as follows.

Through the effect of the load P, the suspension apparatus 1 tilts vertically in the direction that separates the attachment passages 19 and 20 traversed by the snap hook 21 relative to the rope 2, being held in the following manner.

The rope 2 has a taut upper strand 25 that extends between the anchoring point A and the bearing part 12 of the rocker arm member 7.

The intermediate portion 26 of the rope 2, which extends between the bearing part 12 of the rocker arm member 7 and the gap 11, is taut and is diverted relative to the direction of the taut strand 25.

The deviation caused between the taut strand 25 and the taut diverted portion 26 of the rope 2, resulting from the tilting of the suspension apparatus 1, gives rise to a force on the bearing part 12 of the rocker arm member 7 that tends to separate this bearing part 12 from the pinching part 9 of the stationary member 6 and tends to cause the rocker arm member 7 to pivot in the direction that brings the pinching parts 9 and 10 closer together. This pivoting gives rise to a local pinching effect on the rope 2 in the gap 11, between the pinching parts 9 and 10 of the stationary member 6 and the rocker arm member 7. This pinching gives rise to an immobilization of the suspension apparatus 1 on the rope 2.

In this locking and immobilization position, the attachment passages 19 and 20 and the gap 11 between the pinching parts 9 and 10 are located, in a horizontal direction, on either side of the bearing part 12 of the rocker arm member 7 over which the rope 2 is diverted between the taut strand 25 and the taut intermediate portion 26.

The rocker arm member 7 having pivoted, the unlocking lever 14 has pivoted in the opposite direction.

If a user now exerts a force on the part 16 forming a maneuvering arm of the unlocking lever 14, so as to cause the latter to pivot relative to the body 3 in the opposite direction from that corresponding to the aforesaid tilting of the suspension apparatus 1, the end of the part 15 of the unlocking lever 14 acts on a wall of the recess 18 of the arm 7a of the rocker arm member 7 and causes the latter to pivot contrary to the force exerted by the rope 2 on the bearing part 12 in the direction that distances the pinching part 10 of the rocker arm member 7 relative to the pinching part 9 of the stationary member 6, thereby giving rise to an increase in the distance between the pinching parts 9 and 10 and, as a result, a reduction in the pinching effect on the rope 2 in the gap 11 and a partial unlocking.

The pinching effect being reduced, the suspension apparatus 1 slides downward along the rope 2 through the effect of the suspended load P and thus constitutes a descender apparatus.

By controlling the force he exerts on the unlocking lever 14 and thus the pivoting thereof, the user is able to adapt the aforesaid pinching effect in such a manner as to control the speed of descent.

As soon as the user releases the unlocking lever 14, the locking and immobilization effect of the suspension apparatus 1 along the rope 2, described earlier, is produced.

Figure 5:
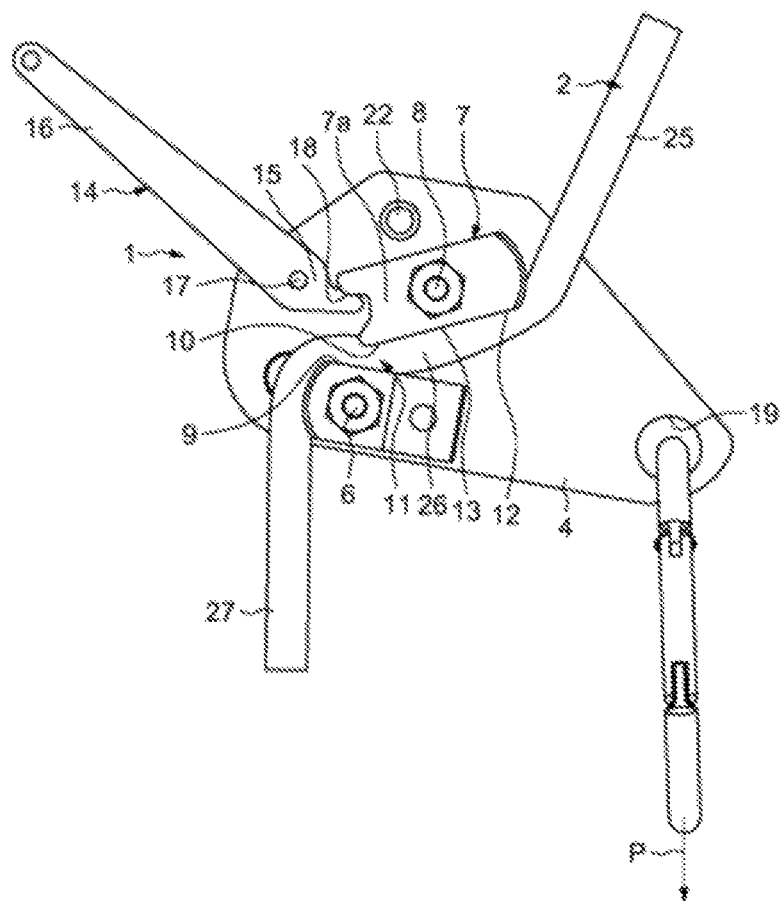
FIG. 5 shows a partial side view of the suspension apparatus in a first partial unlocking position.

As illustrated in FIG. 5, the partial unlocking of the suspension apparatus 1 may be obtained when the rocker arm member 7, stressed by the unlocking lever 14, is once again at a distance from the abutment 22.

Figure 6:
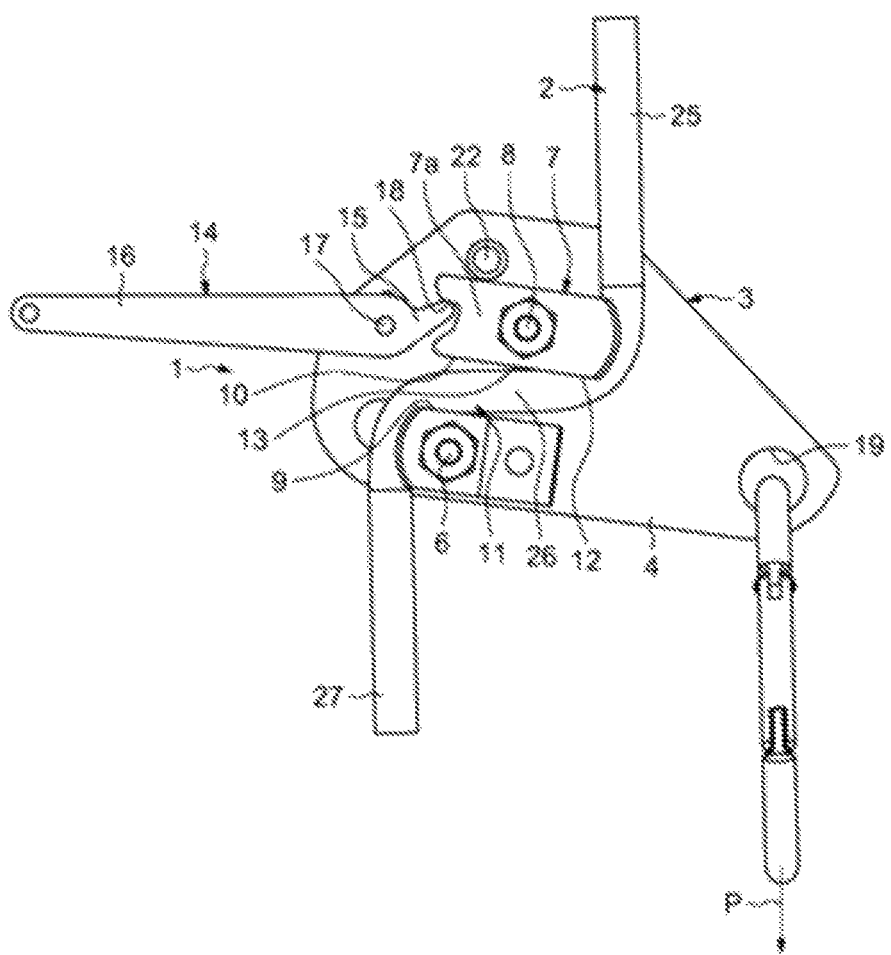
FIG. 6 shows a partial side view of the suspension apparatus in a second partial unlocking position.

As illustrated in FIG. 6, the partial unlocking of the suspension apparatus 1 may be obtained when the rocker arm member 7, stressed by the unlocking lever 14, reaches the abutment 22 and becomes as one, in one direction, with the body 3, and the user pursues his action on the unlocking lever 14 so as to cause the body 3 to tilt relative to the rope 2 in the opposite direction from that which has allowed the unlocking and immobilization position thereof relative to the aforesaid start position thereof to be reached, thereby reducing the deviation of the taut intermediate portion 26 relative to the taut upper strand 25.

Thus, the suspension apparatus 1 has two unlocking capabilities through the effect of the unlocking lever 14.

One of these capabilities is the result of the unlocking possibly being obtained when the rocker arm member 7 is pivoted relative to the body 3 between its position of pinching the rope 2 and the abutment 22.

The other capability is the result of the unlocking possibly being obtained when the rocker arm member 7 is brought first to bear against the abutment 22 and then the body 3 is tilted on account of this bearing through the effect of the unlocking lever 14. At the time of this tilting, the body 3, the rocker arm member 7 and the unlocking lever 14 are interlinked by virtue of the abutment 22 and are immobile relative to one another.

The dimensions and arrangement of the various pieces constituting the suspension apparatus 1, together with the physical characteristics of the rope 2, are adapted such that the effects described above can be achieved.

It follows from the aforesaid that the suspension apparatus 1 may be used not only on a "loose" rope 2, i.e. on a rope having a free lower strand 27 extending below the suspension apparatus 1, but also on a "taut" rope 2, i.e. on a rope having a taut lower strand 27 of which the lower end is attached to a lower anchoring point.

The present invention is not restricted to the example described above. Variant embodiments are possible without departing from the context of the invention.

The invention claimed is:

1. An apparatus for suspending a load on a suspension rope, comprising:
 a body (3) provided with a means (19, 20) for attaching the load and provided with a stationary member (6) and with a pivotal rocker arm member (7) between which the rope (2) passes and which are capable of immobilizing the body along the rope (2) when said body tilts in a direction determined by the load, wherein the rope comprises a taut upper strand (25), an intermediate portion (26), and a loose strand (27), said body also being provided with a stationary abutment (22) and with an unlocking lever (14) mounted pivotably on this body, said unlocking lever being capable of acting on the pivotal rocker arm member (7) in order to cause the pivotal rocker arm member (7) to pivot with respect to the body (3) as far as said abutment (22) and in order to cause said body (3) to tilt in the opposite direction when the rocker arm member (7) bears against said abutment (22), wherein the rocker arm member (7) has a pinching part (10) located facing a pinching part (9) of the stationary member and a bearing part (12) remote from its pinching part in such a manner that the intermediate portion (26) of the rope extends through a gap (11) separating said pinching parts and in front of said bearing part; wherein said means (19, 20) for attaching the load is located on the side of the stationary member relative to the rope and on the side of the bearing part of the rocker arm member relative to said gap; such that, through the effect of the suspended load, said intermediate portion of the rope is diverted relative to the taut upper strand of the rope and acts on said bearing part (12) of the rocker arm member in the direction that tends to bring the pinching parts closer together, in such a manner as to produce a local pinching effect on the suspension rope between these pinching parts (9, 10); wherein the pinching parts are held together irrespective of whether the loose strand of the rope is taut or loose; wherein said abutment (22) for the rocker arm member limits the gap (11) between said pinching parts (9, 10) to a maximum separation, wherein, in a first phase of releasing the rope, said unlocking lever (14) is configured to act on the rocker arm member (7) in the direction of the distancing of said pinching parts (9, 10) when said unlocking lever (14) is pivoted relative to the body in the opposite direction from the pivoting direction of the rocker arm member (7); and wherein, in a second phase of releasing the rope, said unlocking lever (14) is configured to cause the body to tilt in the direction of the reduction of the deviation of the intermediate portion (26) of the suspension rope relative to said taut strand (25) when the rocker arm member bears against said abutment (22) through the effect of said unlocking lever.

2. The apparatus as claimed in claim 1, wherein said rocker arm member (7) comprises opposite arms (7a, 7b) having said pinching part (10) and said bearing part (12).

3. The apparatus as claimed in claim 2, wherein said unlocking lever (14) has an end engaged in a recess (18) of the end of the arm (7a) of the rocker arm member (7) having said pinching part (10).

4. The apparatus as claimed in claim 1, wherein said body (3) comprises plates (4, 5) having corresponding passages (19, 20) for attaching the load.

* * * * *